United States Patent
Zhu et al.

(10) Patent No.: US 12,463,755 B2
(45) Date of Patent: Nov. 4, 2025

(54) METHOD AND DEVICE FOR DATA STORAGE

(71) Applicant: UNISOC (CHONGQING) TECHNOLOGIES CO., LTD., Chongqing (CN)

(72) Inventors: Zhihui Zhu, Chongqing (CN); Yi Xu, Chongqing (CN); Qiao Feng, Chongqing (CN); Shu Tan, Chongqing (CN)

(73) Assignee: UNISOC (CHONGQING) TECHNOLOGIES CO., LTD., Chongqing (CN)

( * ) Notice: Subject to any disclaimer, the term of this patent is extended or adjusted under 35 U.S.C. 154(b) by 648 days.

(21) Appl. No.: 17/733,239

(22) Filed: Apr. 29, 2022

(65) Prior Publication Data

US 2022/0263607 A1   Aug. 18, 2022

Related U.S. Application Data

(63) Continuation of application No. PCT/CN2020/093448, filed on May 29, 2020.

(30) Foreign Application Priority Data

Oct. 30, 2019   (CN) .......................... 201911044606.4

(51) Int. Cl.
*H04L 1/1829*  (2023.01)
*H04L 1/00*  (2006.01)
*H04L 1/1812*  (2023.01)

(52) U.S. Cl.
CPC .......... *H04L 1/1835* (2013.01); *H04L 1/0061* (2013.01); *H04L 1/1812* (2013.01)

(58) Field of Classification Search
CPC ... H04L 1/1835; H04L 1/0061; H04L 1/1812; H04L 1/1822; H04L 1/004; H04L 1/1829; H04L 1/1845; H04L 1/1614; H04L 1/1809; H04L 1/1621; H04L 1/1671; H04L 1/1861; H04L 1/1607; H04L 1/0073; H04L 1/18;
(Continued)

(56) References Cited

U.S. PATENT DOCUMENTS 10,292,157 B2 *   5/2019   Meng ..................... H04L 1/1835
11,601,223 B2 *   3/2023   Sun ......................... H04W 72/23
(Continued)

FOREIGN PATENT DOCUMENTS

| CN | 101094183 A | 12/2007 |
|---|---|---|
| CN | 102065484 A | 5/2011 |

(Continued)

*Primary Examiner* — Un C Cho
*Assistant Examiner* — Rasha K Fayed
(74) *Attorney, Agent, or Firm* — Raj S. Dave; Dave Law Group LLC

(57) ABSTRACT

A method for data storage and a device for data storage are provided in the disclosure. The method includes the following. Multiple storage sub-blocks in a storage space are determined according to a size of a code block (CB) of a hybrid automatic repeat request (HARQ) process, where the storage sub-block has a sub-block indicator, and the sub-block indicator indicates a next storage sub-block to which a present storage sub-block points. The CB of the HARQ process is stored to the multiple storage sub-blocks.

20 Claims, 6 Drawing Sheets

(58) Field of Classification Search
CPC ... H04L 1/1806; H04L 1/1874; H04L 1/1896;
H04L 1/1816; H04L 1/1819; H04L
1/1838; H04L 1/1887; H04L 1/005; H04L
1/0066; H04L 1/0067; H04L 1/0071;
H04L 1/0068; H04L 1/0043; H04L
5/0007; H04L 5/0055; H04L 5/0053;
H04L 5/0069; H04L 5/001; H04L 5/0023;
H04L 5/14; H04L 47/62; H04L 25/067;
H04L 67/568; H04W 72/20; H04W
72/044; H04W 72/1252; H04W 72/52;
H04W 72/12; H04W 52/243; H04W
52/267; H04W 52/262; H04W 28/065;
H04W 28/22; Y02D 10/00; G06F
11/1004; G06F 11/1076; G06F 12/06
See application file for complete search history.

(56) References Cited

U.S. PATENT DOCUMENTS

| | | | | |
|---|---|---|---|---|
| 2005/0276230 | A1* | 12/2005 | Akahane | H04L 43/00 370/252 |
| 2007/0124647 | A1* | 5/2007 | Chen | G06F 11/1068 714/763 |
| 2008/0276147 | A1* | 11/2008 | Gho | H04L 25/067 714/748 |
| 2009/0228755 | A1* | 9/2009 | Franovici | H04L 1/1845 714/751 |
| 2012/0051366 | A1* | 3/2012 | Li | H04L 49/9057 370/412 |
| 2015/0049710 | A1* | 2/2015 | Zhang | H04L 1/1819 370/329 |
| 2016/0088635 | A1* | 3/2016 | Davydov | H04L 1/1812 370/329 |
| 2016/0119105 | A1* | 4/2016 | Jiang | H04L 1/1812 370/329 |
| 2016/0218830 | A1* | 7/2016 | Martinez | H04L 1/1841 |
| 2016/0233999 | A1 | 8/2016 | Chendamarai Kannan et al. | |
| 2017/0026297 | A1* | 1/2017 | Sun | H04B 7/0623 |
| 2017/0331591 | A1* | 11/2017 | Nammi | H04L 1/0045 |
| 2018/0054819 | A1* | 2/2018 | Meng | H04L 1/0625 |
| 2019/0103944 | A1* | 4/2019 | Wu | H04L 1/0052 |
| 2020/0028524 | A1* | 1/2020 | Huang | H03M 13/13 |
| 2020/0099480 | A1* | 3/2020 | Grövlen | H04L 1/1822 |
| 2020/0136986 | A1* | 4/2020 | Southworth | H04L 67/568 |
| 2020/0153561 | A1* | 5/2020 | Khosravirad | H04L 1/1835 |
| 2021/0333999 | A1* | 10/2021 | Park | G06F 3/064 |
| 2022/0116171 | A1* | 4/2022 | Zhang | H04L 5/0094 |

FOREIGN PATENT DOCUMENTS

| | | |
|---|---|---|
| CN | 102148676 A | 8/2011 |
| CN | 102158330 A | 8/2011 |
| CN | 102215097 A | 10/2011 |
| CN | 102479159 A | 5/2012 |
| CN | 103166747 A | 6/2013 |
| CN | 104683073 A | 6/2015 |
| CN | 107800516 A | 3/2018 |

* cited by examiner

METHOD AND DEVICE FOR DATA STORAGE

CROSS-REFERENCE TO RELATED APPLICATION(S)

This application is a continuation of International Application No. PCT/CN2020/093448, filed May 29, 2020, which claims priority to Chinese Patent Application No. 201911044606.4, filed Oct. 30, 2019, the disclosures of which are hereby incorporated by reference in their entireties.

TECHNICAL FIELD

This disclosure relates to the field of communication technology, and particularly to a method and device for data storage.

BACKGROUND

Hybrid automatic repeat request (HARQ) is a technology that combines a forward error correction (FEC) decoding and an automatic repeat request (ARQ). HARQ technology can efficiently compensate for bit errors caused by link adaptation, and improve data transmission rate/reduce data transmission delay. Upon receiving first transmitted data, a receiver decodes and checks the first transmitted data. If a check result is incorrect, the receiver saves present soft information, and feeds back negative acknowledgement (NACK) to a transmitter. The transmitter retransmits data according to received NACK feedback. Upon receiving retransmitted data, the receiver combines previous data with new soft information. If a check result is correct, the receiver feeds back acknowledgement (ACK) to the transmitter, so that the transmitter knows that such data is transmitted correctly.

However, in relevant technologies, large storage resources are required when storing data of an HARQ process, which is unable to achieve flexible allocation and management of storage resources, has high power consumption, and generates more storage fragments.

SUMMARY

In view of this, the disclosure provides a method for data storage. The method comprises: determining a plurality of storage sub-blocks in a storage space according to a size of a code block (CB) of a hybrid automatic repeat request (HARQ) process, the storage sub-block having a sub-block indicator, and the sub-block indicator indicating a next storage sub-block to which a present storage sub-block points; and storing the CB of the HARQ process to the plurality of storage sub-blocks.

In some implementations, the storage sub-block comprises a storage sub-block of a first type and the storage sub-block of the first type is used to store decoded data. Determining the plurality of storage sub-blocks in the storage space according to the size of the CB of the HARQ process comprises: determining the plurality of storage sub-blocks in storage sub-blocks of the first type according to the size of the CB, on condition that a cyclic redundancy check (CRC) of the CB subjected to a forward error correction (FEC) decoding is correct. Storing the CB of the HARQ process to the plurality of storage sub-blocks comprises: storing the CB subjected to the FEC decoding to the determined plurality of storage sub-blocks of the first type.

In some implementations, a size of the storage sub-block of the first type is ¼ to 1 times a size of a largest CB of the HARQ process.

In some implementations, the storage sub-block comprises a storage sub-block of a second type and the storage sub-block of the second type is used to store data before decoding. Determining the plurality of storage sub-blocks in the storage space according to the size of the CB of the HARQ process comprises: determining the plurality of storage sub-blocks in storage sub-blocks of the second type according to the size of the CB, on condition that a CRC of the CB subjected to an FEC decoding is incorrect. Storing the CB of the HARQ process to the plurality of storage sub-blocks comprises: storing the CB before decoding to the determined plurality of storage sub-blocks of the second type.

In some implementations, a size of the storage sub-block of the second type is ⅛ to ½ times a size of a largest CB of the HARQ process.

In some implementations, the method further comprises: setting a process retransmission identification of the HARQ process according to whether the CB of the HARQ process is stored in the storage space, wherein the process retransmission identification is set to be valid to indicate that the HARQ process carries retransmitted data, on condition that the CB of the HARQ process exists in the storage space; or the process retransmission identification is set to be invalid to indicate that the HARQ process carries new data, on condition that no CB of the HARQ process exists in the storage space.

In some implementations, the method further comprises: setting a check-result identification of the CB according to a result of the CRC of the CB, wherein the check-result identification comprises a correct check identification and an incorrect check identification.

In some implementations, storing the CB of the HARQ process to the plurality of storage sub-blocks comprises: setting an identification of a first sub-block of the CB to be a first storage sub-block for storing the CB among the plurality of storage sub-blocks; setting a sub-block occupancy identification of the storage sub-block to be valid, wherein the sub-block occupancy identification being valid indicates that the storage sub-block is occupied; setting the sub-block indicator of the storage sub-block, wherein for each storage sub-block from the first storage sub-block to a penultimate storage sub-block, a sub-block indicator of the storage sub-block points to a next storage sub-block, and a sub-block indicator of a last storage sub-block is invalid; and setting a last sub-block identification of the storage sub-block, comprising: setting a last sub-block identification of the last storage sub-block to be valid, and setting a last sub-block identification of each of other storage sub-blocks to be invalid, wherein the last sub-block identification indicates that a storage sub-block corresponding thereto is the last storage sub-block for storing the CB among the plurality of storage sub-blocks.

In some implementations, the HARQ process comprises a plurality of CBs, and the method further comprises: on condition that data carried in the HARQ process is retransmitted data, determining from the storage space a CB of the HARQ process whose CRC is incorrect, performing HARQ combination on the retransmitted data and the CB whose CRC is incorrect to obtain HARQ combined data of the CB whose CRC is incorrect, and performing FEC decoding and CRC on the HARQ combined data; on condition that the CRC of the HARQ combined data is correct, determining from the storage space a CB of the HARQ process whose CRC is correct, to obtain a complete decoding result of the HARQ process; or on condition that the CRC of the HARQ combined data is incorrect, storing the HARQ combined data to the storage space and overwriting the CB of the HARQ process whose CRC is incorrect.

In some implementations, after obtaining the complete decoding result of the HARQ process, the method further comprises: releasing the storage space of the CB of the HARQ process.

In some implementations, releasing the storage space of the CB of the HARQ process comprises: setting a process retransmission identification of the HARQ process to be invalid; and setting a sub-block occupancy identification of the storage sub-block storing the CB of the HARQ process to be invalid.

In some implementations, the storage space comprises an off-chip storage space and an on-chip storage space.

According to another aspect of the disclosure, a device for data storage is provided. The device comprises a processor and a memory. The memory is coupled with the processor, and stores processor-executable instructions which, when executed by the processor, cause the processor to execute the above method.

According to another aspect of the disclosure, a non-transitory computer-readable storage medium is provided. The non-transitory computer-readable storage medium stores computer program instructions which, when executed by a computer, cause the computer to execute the above method.

Exemplary implementations will be described in detail with reference to accompanying drawings described below, and other features and aspects of the disclosure will become clear.

BRIEF DESCRIPTION OF THE DRAWINGS

Accompanying drawings contained in the specification and constituting a part of the specification together with the specification illustrate exemplary implementations, features, and aspects of the disclosure, and are used to explain the principles of the disclosure.

DETAILED DESCRIPTION

Figure 1:
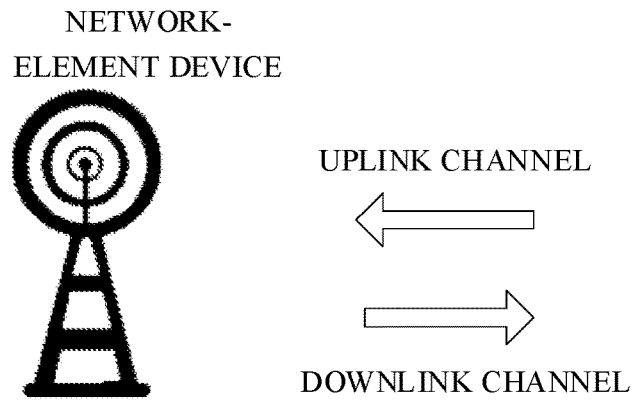
FIG. 1 is a schematic diagram illustrating a communication system according to implementations of the disclosure.

Hereinafter, exemplary implementations, features, and aspects of the disclosure will be described in detail with reference to accompanying drawings. The same reference numerals in the accompanying drawings denote elements having a same or similar function. While various aspects of the implementations are illustrated in the accompanying drawings, the accompanying drawings are not necessarily drawn to scale unless otherwise indicated.

The term "exemplary" referred to herein means "serving as an example, implementation, or illustration". Any implementation described herein as "exemplary" is not necessarily to be construed as preferred or advantageous over other implementations.

In addition, in order to better illustrate the disclosure, various specific details are given in the detailed implementations described below. Those skilled in the art should understand that the disclosure can also be implemented without certain specific details. In some implementations, methods, means, components, and circuits well known to those skilled in the art have not been described in detail, to highlight the subject matter of the disclosure.

Implementations of the disclosure may be applicable to a 5th generation (5G) communication system, and may also be applicable to a 4th generation (4G) communication system, a 3rd generation (3G) communication system, a satellite communication system, and various future evolved communication systems, such as a 6th generation (6G) communication system, a 7th generation (7G) communication system, etc.

The implementations of the disclosure may also be applicable to different network architectures. The network architecture includes, but is not limited to, a relay network architecture, a dual-link architecture, and a vehicle-to-everything (vehicle-to-everything communication) architecture.

"5G CN" in implementations of the disclosure may also be referred to as a new core network, a 5G new core, a next generation core (NGC), or the like. 5G CN is set up independently of an existing core network, such as an evolved packet core (EPC).

"Network-element device" in implementations of the disclosure may be a base station (BS) which may also be referred to as base station device. The network-element device is a device providing a wireless communication function and deployed in a radio access network (RAN). For example, a device for providing a base station function in a 2nd generation (2G) network includes a base transceiver station (BTS) and a base station controller (BSC). A device for providing a base station function in a 3G network includes a NodeB and a radio network controller (RNC). A device for providing a base station function in a 4G network includes an evolved NodeB (eNB). A device for providing a base station function in a wireless local area network (WLAN) is an access point (AP). A device for providing a base station function in 5G new radio (NR) includes a gNodeB (gNB) and a device for providing a base station function in a future communication system.

"User equipment (UE)" in implementations of the disclosure may refer to various forms of access terminals, subscriber units, subscriber stations, mobile stations (MS), remote stations, remote terminals, and mobile equipment, user terminals, terminal equipment, wireless communication equipment, user agents, or user device. The UE may also be a cellular telephone, a cordless telephone, a session initiation protocol (SIP) telephone, a wireless local loop (WLL) station, a personal digital assistant (PDA), a handheld device with a wireless communication function, a computing device, other processing devices coupled with a wireless modem, an in-vehicle device, a wearable device, user equipment in a future 5G network or terminal equipment in a future evolved public land mobile network (PLMN), etc., which is not limited in implementations of the disclosure.

Detailed description will be given below.

According to implementations, a method for data storage. The method includes: determining a plurality of storage sub-blocks in a storage space according to a size of a code block (CB) of a hybrid automatic repeat request (HARQ) process, the storage sub-block having a sub-block indicator, and the sub-block indicator indicating a next storage sub-block to which a present storage sub-block points; and storing the CB of the HARQ process to the plurality of storage sub-blocks.

According to implementations, a device for data storage is provided. The device includes a processor and a memory. The memory is coupled with the processor, and stores processor-executable instructions which, when executed by the processor, cause the processor to execute the above method.

According to implementations, a non-transitory computer-readable storage medium is provided. The non-transitory computer-readable storage medium stores computer program instructions which, when executed by a computer, cause the computer to execute the above method.

FIG. 1 is a schematic diagram illustrating a communication system according to implementations of the disclosure. Various implementations of the disclosure can be applicable to the communication system illustrated in FIG. 1. The following definitions are given in implementations of the disclosure: one-way communication link from an access network to the UE is a downlink, data transmitted on the downlink is downlink data, and a transmission direction of the downlink data is referred to as a downlink direction; on the contrary, one-way communication link from the UE to the access network is an uplink, data transmitted on the uplink is uplink data, and a transmission direction of the uplink data is referred to as an uplink direction.

It should be understood that, the term "and/or" herein merely describes an association relationship between associated objects, which means that there can be three relationships. For example, "A and/or B" can mean A alone, both A and B exist, and B alone. In addition, the character "/" herein generally indicates that the associated objects are in an "or" relationship.

The term "connection" in implementations of the disclosure refers to various connection manners such as direct connection or indirect connection for communication between devices, which is not limited in implementations of the disclosure.

The term "network" and "system" in implementations of the disclosure express a same concept, and a communication system may also be referred to as a communication network. The term "connection" in implementations of the disclosure refers to various connection manners such as direct connection or indirect connection, for example, a connection between different devices through a communication interface, which is not limited herein.

Figure 2:
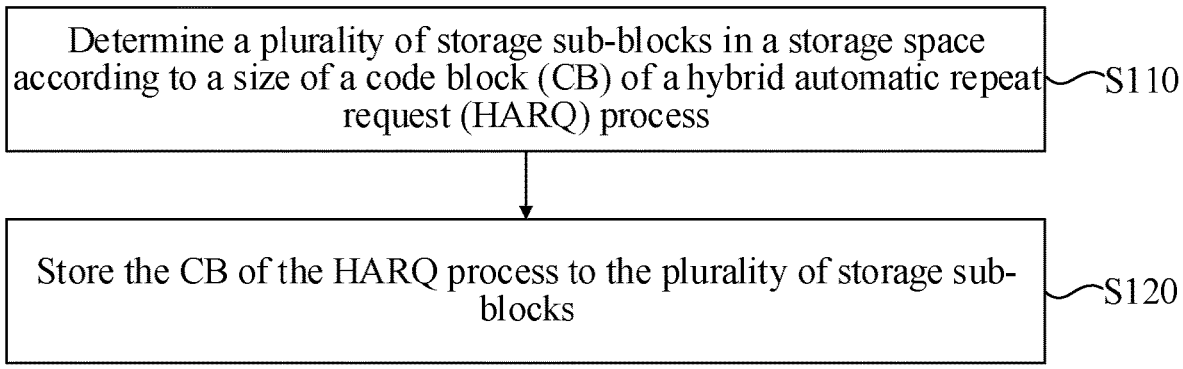
FIG. 2 is a schematic flowchart illustrating a method for data storage according to implementations of the disclosure.

Referring to FIG. 2, FIG. 2 is a schematic flowchart illustrating a method for data storage according to implementations of the disclosure. The method is applied to a UE and includes:

At S110, determining multiple storage sub-blocks in a storage space according to a size of a CB of an HARQ process, where the storage sub-block has a sub-block indicator, and the sub-block indicator indicates a next storage sub-block to which a present storage sub-block points;

At S120, storing the CB of the HARQ process to the multiple storage sub-blocks.

The HARQ process generally refers to a process that a base station schedules for one data transmission and then receives ACK/NACK information. The CB herein is a CB of data transmitted in the HARQ process. Storing of the CB may be performed after the UE receives the CB and completes a check of the CB in the HARQ process.

According to the above method of implementations of the disclosure, the multiple storage sub-blocks in the storage space are determined according to the size of the CB of the HARQ process, and the CB of the HARQ process is stored into the multiple storage sub-blocks. In implementations of the disclosure, since each of the storage sub-blocks has a sub-block indicator which indicates the next storage sub-block to which the present storage sub-block points, chain control of the storage sub-blocks can be realized, so that management and allocation of storage resources in the storage space can be more convenient and flexible, and storage fragmentation and power consumption can be reduced effectively.

In some implementations, the storage space includes an off-chip storage space and an on-chip storage space.

Figure 3:
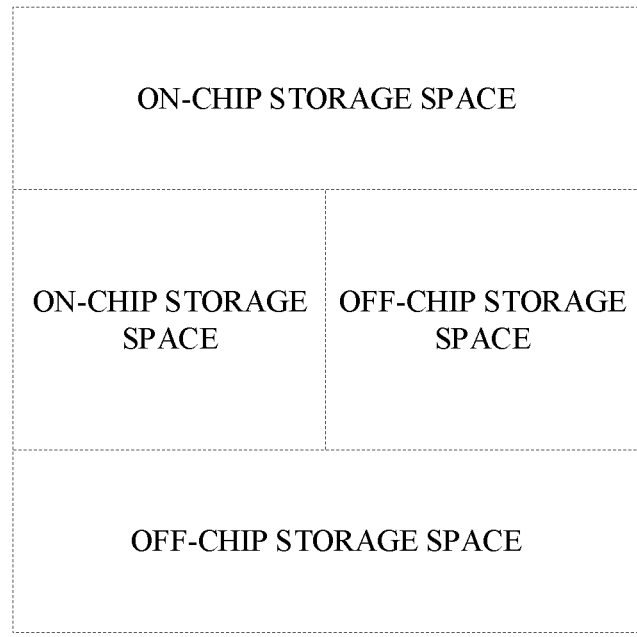
FIG. 3 is a schematic diagram illustrating a storage space according to implementations of the disclosure.

Referring to FIG. 3, FIG. 3 is a schematic diagram illustrating a storage space according to implementations of the disclosure.

In some implementations, as illustrated in FIG. 3, since the storage space includes an off-chip storage space and an on-chip storage space, determining in the storage space the storage sub-blocks for storing the CB of the HARQ process includes: determining in the on-chip storage space multiple storage sub-blocks for storing the CB of the HARQ process. In this case, for a present HARQ process, a CB of the HARQ process is stored in the on-chip storage space. As such, only use the on-chip storage space to store the CB, which can reduce power consumption.

Alternatively, part of the storage sub-blocks is determined in the on-chip storage space, and another part of the storage sub-blocks is determined in the off-chip storage space. In this case, part of the CB of the HARQ process is stored in the on-chip storage space, and another part of the CB is stored in the off-chip storage space. As such, in implementations of the disclosure, storage flexibility can be increased, storage pressure of the on-chip storage space can be reduced, and pressure and overhead of a storage bus can be reduced.

Of course, in implementations of the disclosure, part of a CB of the HARQ process is stored in the on-chip storage space while another part of the CB is stored in the off-chip storage space, or contents of first K HARQ processes are stored in the on-chip storage space while contents of last T HARQ processes are stored in the off-chip storage space, which is not limited in the disclosure.

In implementations of the disclosure, the storage sub-blocks may also be determined only in the off-chip storage space, to store the CB of the HARQ process.

According to the above method of implementations of the disclosure, the off-chip storage space and the on-chip storage space can be flexibly configured to store the CB of the HARQ process, which can increase flexibility of data storage and environmental adaptability.

In some implementations, the on-chip storage space includes a storage space integrated in a chip. For example, the on-chip storage space may include a high-speed storage medium such as a cache and a random access memory (RAM). The off-chip storage space may include a hard disk, a read-only memory (ROM), a double data rate (DDR) synchronous dynamic random access memory, and other storage media. Of course, the above description is exemplary, and specific forms of the on-chip storage space and the off-chip storage space are not limited in the disclosure.

In some implementations, the off-chip storage space is controlled through direct memory access (DMA). Controlling the off-chip storage space may include: obtaining storage-space information of the off-chip storage space, performing read/write operations on the off-chip storage space, releasing a storage space of the off-chip storage space, and other operations.

In implementations of the disclosure, in addition to classifying a storage space into the off-chip storage space or the on-chip storage space according to a type of the storage space, the storage space may be further divided according to a data type of data to-be-stored.

Figure 4:
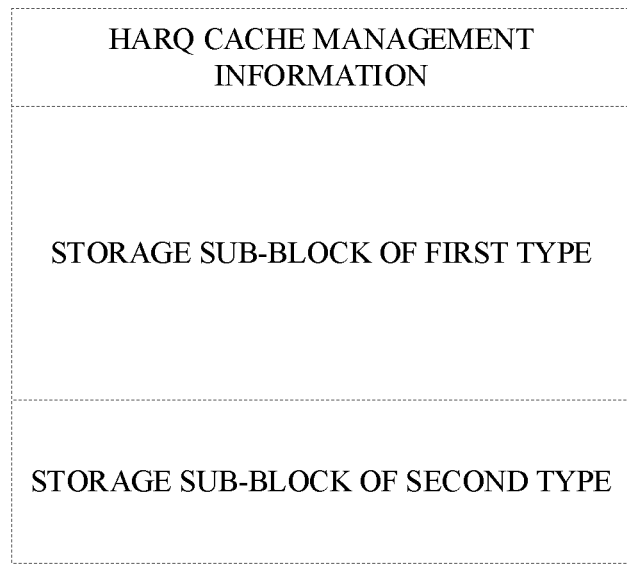
FIG. 4 is a schematic diagram illustrating storage-related information according to implementations of the disclosure.

Referring to FIG. 4, FIG. 4 is a schematic diagram illustrating storage-related information according to implementations of the disclosure.

In some implementations, the CB of the HARQ process includes a CB of a first type and a CB of a second type, and accordingly, the storage sub-block in the storage space of the disclosure includes a storage sub-block of the first type and a storage sub-block of the second type.

As an example, the CB of a first type may be data obtained after a receiver (e.g., a UE) performs forward error correction (FEC) decoding on received data, and may also be referred to as hard information.

As an example, the CB of a second type may be data before decoding, and may also be referred to as soft information.

In some implementations, the storage sub-block of the first type is used to store decoded data. The operation S110 of determining the multiple storage sub-blocks in the storage space according to the size of the CB of the HARQ process includes: determining the multiple storage sub-blocks in storage sub-blocks of the first type according to the size of the CB, on condition that a cyclic redundancy check (CRC) of the CB subjected to an FEC decoding is correct.

In some implementations, the operation S120 of storing the CB of the HARQ process to the multiple storage sub-blocks includes: storing the CB subjected to the FEC decoding to the determined multiple storage sub-blocks of the first type.

In some implementations, a size of the storage sub-block of the first type is ¼ to 1 times a size of a largest CB of the HARQ process.

As an example, the size of the storage sub-block of the first type may be the same as that of the largest CB of the HARQ process, may be ¼ times that of the largest CB of the HARQ process, or may be ½ times that of the largest CB of the HARQ process.

According to the above method of implementations of the disclosure, when the CB of the HARQ process has a data type of the first type, the CB can be stored to a storage sub-block of the first type.

In some implementations, the storage sub-block of the second type is used to store data before decoding. The operation S110 of determining the multiple storage sub-blocks in the storage space according to the size of the CB of the HARQ process includes: determining the multiple storage sub-blocks in storage sub-blocks of the second type according to the size of the CB, on condition that a CRC of the CB subjected to an FEC decoding is incorrect.

In some implementations, the operation S120 of storing the CB of the HARQ process to the multiple storage sub-blocks includes: storing the CB before decoding to the determined multiple storage sub-blocks of the second type.

In some implementations, a size of the storage sub-block of the second type is ⅛ to ½ times a size of a largest CB of the HARQ process.

As an example, the size of the storage sub-block of the second type may be ⅛ times that of the largest CB of the HARQ process, may be ¼ times that of the largest CB of the HARQ process, or may be ½ times that of the largest CB of the HARQ process.

According to the above method of implementations of the disclosure, when the CB of the HARQ process has a data type of the second type, the CB can be stored to a storage sub-block of the second type.

According to the above method of implementations of the disclosure, data type used to store the CB of the HARQ process is determined according to a result of a CRC of the CB of the HARQ process. If the check is correct, hard information (i.e., decoded data) of the CB of the HARQ process is stored to the storage sub-block of the first type. On the other hand, if the check is incorrect, soft information (i.e., data before decoding) of the CB of the HARQ process is stored to the storage sub-block of the second type. As such, management of storage sub-blocks can be implemented according to the data type, thereby increasing flexibility of resource storage.

In addition, in implementations of the disclosure, utilization rate of storage resources can be increased by setting the size of the storage sub-block of the first type and the size of the storage sub-block of the second type.

Considering utilization rate of storage sub-blocks, the size of the storage sub-block should not be too large, to avoid space waste when storing a small-sized CB. Considering read/write efficiency, the size of the storage sub-block should not be too small. The size of the storage sub-block is herein determined according to the size of the largest CB, for example, the size of the storage sub-block is set to be 1/N of the size of the largest CB (where N is a positive integer). As such, both the utilization rate and the read/write efficiency can be taken into account.

In some implementations, the size of the CB of the HARQ process can also be predicted according to an application scenario in advance, to flexibly set the size of the storage sub-block of the first type and the size of the storage sub-block of the second type, which can meet requirements of different scenarios and increase flexibility and environmental adaptability of the method for data storage of implementations of the disclosure.

Referring to FIG. 4 again, the UE of implementations of the disclosure can generate and save HARQ cache management information locally, and control and maintain the HARQ cache management information to realize control of data storage.

As an example, the HARQ cache management information may include process information of the HARQ process (e.g., a process ID, and a process retransmission identification indicating whether data carried in the HARQ process is new data or retransmitted data), information of the CB of the HARQ process (the information of the CB may include, for example, a CB ID, a check-result identification indicating a check result of the CB, and a first sub-block identification (i.e., an identification of a first storage sub-block) of the CB), information of a storage sub-block storing the CB (the information of the storage sub-block may include, for example, ID of the storage sub-block, a sub-block occupancy identification indicating whether the storage sub-block is occupied, a last sub-block identification indicating whether the storage sub-block is a last storage sub-block in a storage sub-block chain, and a sub-block indicator indicating a next storage sub-block to which the storage sub-block connects), and other information.

Flexible and convenient management of storage resources in the storage space can be realized by modifying and maintaining the HARQ cache management information, thereby improving efficiency of data storage and utilization rate of storage resources, and reducing fragmentation.

Each piece of information in the HARQ cache management information will be exemplarily described below.

In some implementations, the method further includes: setting a process retransmission identification of the HARQ process according to whether the CB of the HARQ process is stored in the storage space. The process retransmission identification is set to be valid to indicate that the HARQ process carries retransmitted data, on condition that the CB of the HARQ process exists in the storage space; or the process retransmission identification is set to be invalid to indicate that the HARQ process carries new data, on condition that no CB of the HARQ process exists in the storage space.

If historical data (i.e., previous data) of the HARQ process (which may include soft information (i.e., the CB before decoding) and/or hard information (i.e., the CB after decoding), etc.) is stored in the storage space, the retransmission identification of the HARQ process is set to be valid. Upon receiving data of the HARQ process transmitted by a network-element device, a receiver can perform HARQ combination on data in the storage space and received data subjected to a de-rate matching, and perform FEC decoding and CRC on HARQ combined data. If no historical data of the HARQ process is stored in the storage space, the retransmission identification of the HARQ process is set to be invalid. Upon receiving the data of the HARQ process transmitted by the network-element device, the receiver can perform de-rate matching, FEC decoding, and CRC on received data directly.

An implementation of processing the data of the HARQ process is not limited in the disclosure, and implementations and processes of the de-rate matching, the FEC decoding, and the CRC are not limited in the disclosure, which can be learned from relevant technologies by those skilled in the art.

In some implementations, although historical data of the HARQ process is stored in the storage space, the process retransmission identification of the HARQ process can still be set to be invalid, in this case, the data of the HARQ process is regarded as new data.

As an example, if the storage space is released by a user through software, or there is an error in the historical data, or severe interference occurs, the process retransmission identification can be set to be invalid, so that the data of the HARQ process is regarded as new data.

In some implementations, in an initialization phase, a process retransmission identification of each process can be set to be invalid, that is, data of each process is new data by default.

In some implementations, the method further includes: setting a check-result identification of the CB according to a result of the CRC of the CB, where the check-result identification includes a correct check identification and an incorrect check identification.

After the CB is decoded and checked, if the result of the CRC is correct, the check-result identification of the CB is set as the correct check identification. Of course, in this case, decoded data of the CB is stored to the storage sub-block of the first type.

After the CB is decoded and checked, if the result of the CRC is incorrect, the check-result identification of the CB is set as the incorrect check identification. Of course, in this case, data before decoding of the CB is stored to the storage sub-block of the second type.

In some implementations, the operation S120 of storing the CB of the HARQ process to the multiple storage sub-blocks includes: setting a first sub-block identification of the CB to be a first storage sub-block for storing the CB among the multiple storage sub-blocks; setting a sub-block occupancy identification of the storage sub-block to be valid, where the sub-block occupancy identification being valid indicates that the storage sub-block is occupied; setting the sub-block indicator of the storage sub-block, where for each storage sub-block from the first storage sub-block to a penultimate storage sub-block, a sub-block indicator of the storage sub-block points to a next storage sub-block, and a sub-block indicator of a last storage sub-block is invalid; and setting a last sub-block identification of the storage sub-block, including: setting a last sub-block identification of the last storage sub-block to be valid, and setting a last sub-block identification of each of other storage sub-blocks to be invalid, where the last sub-block identification indicates that a storage sub-block corresponding thereto is the last storage sub-block for storing the CB among the multiple storage sub-blocks.

According to the above method of implementations of the disclosure, the storage-related information of the storage sub-block can be set and managed, to improve efficiency of data storage.

According to the foregoing description, in implementations of the disclosure, storage sub-blocks are managed in a form of a linked list, which can realize flexible configuration and management of storage resources in the storage space, and can reduce fragmentation.

The storing of the CB of the HARQ process will be exemplarily described below.

Figure 5:
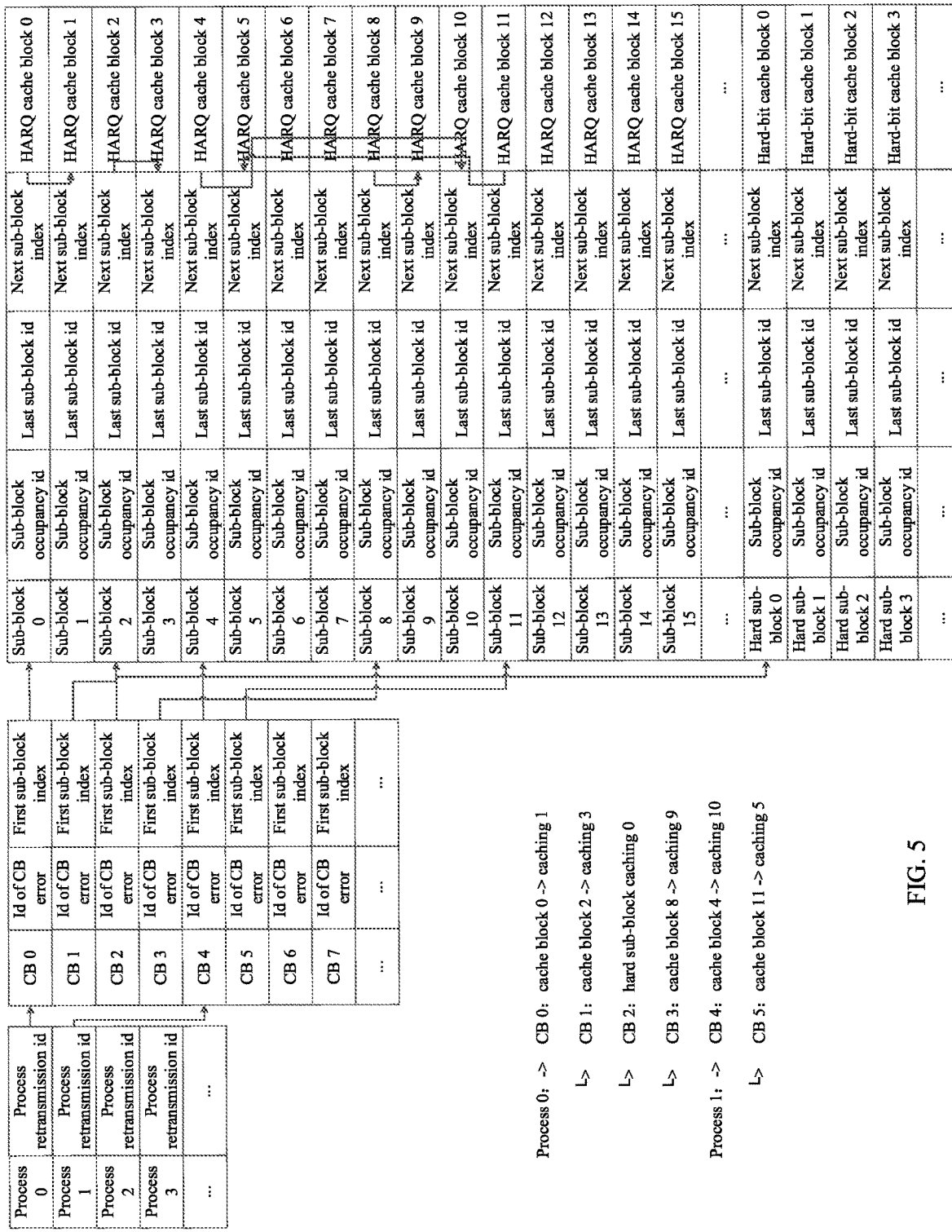
FIG. 5 is a schematic diagram illustrating data storage according to implementations of the disclosure.

Referring to FIG. 5, FIG. 5 is a schematic diagram illustrating data storage according to implementations of the disclosure. Sub-block 0 to sub-block 15 are storage sub-blocks of the second type, and hard sub-block 0 to hard sub-block 3 are storage sub-blocks of the first type.

FIG. 5 is a schematic diagram illustrating process 0 to process 3. Taking process 0 as an example, process 0 includes CB 0~CB 3.

Data of CB 0 is stored in sub-block 0 (i.e., the storage sub-block of the second type) and sub-block 1, that is, stored in HARQ cache block 0 and HARQ cache block 1 in FIG. 5, where a first sub-block index (i.e., a first sub-block identification) of CB 0 is sub-block 0, and a next sub-block index (i.e., a sub-block indicator) of sub-block 0 is sub-block 1. In this example, a result of a CRC of CB 0 is incorrect, a sub-block occupancy identification of each of sub-block 0 and sub-block 1 is valid, a last sub-block identification of sub-block 0 is invalid, and a last sub-block identification of sub-block 1 is valid.

Data of CB 1 is stored in sub-block 2 and sub-block 3, that is, stored in HARQ cache block 2 and HARQ cache block 3 in FIG. 5, where a first sub-block index of CB 1 is sub-block 2, and a next sub-block index (i.e., a sub-block indicator) of sub-block 2 is sub-block 3. In this example, a result of a CRC of CB 1 is incorrect, a sub-block occupancy identification of each of sub-block 2 and sub-block 3 is valid, a last sub-block identification of sub-block 2 is invalid, and a last sub-block identification of sub-block 3 is valid.

Data of CB 2 is stored in hard sub-block 0 (i.e., the storage sub-block of the first type), that is, stored in hard-bit cache block 0 in FIG. 5, where a first sub-block index of CB 2 is hard sub-block 0, and a next sub-block index (i.e., a sub-block indicator) of hard sub-block 0 is invalid (i.e., hard sub-block 0 does not point to any hard sub-block). In this example, a result of a CRC of CB 2 is correct, a sub-block occupancy identification of hard sub-block 0 is valid, and a last sub-block identification of hard sub-block 0 is valid.

Data of CB 3 is stored in sub-block 8 and sub-block 9, that is, stored in HARQ cache block 8 and HARQ cache block 9 in FIG. 5, where a first sub-block index of CB 3 is sub-block 8, and a next sub-block index (i.e., a sub-block indicator) of sub-block 8 is sub-block 9. In this example, a result of a CRC of CB 3 is incorrect, a sub-block occupancy identification of each of sub-block 8 and sub-block 9 is valid, a last sub-block identification of sub-block 8 is invalid, and a last sub-block identification of sub-block 9 is valid.

Taking process 1 as an example, process 1 includes CB 4~CB 5.

Data of CB 4 is stored in sub-block 4 and sub-block 10, that is, stored in HARQ cache block 4 and HARQ cache block 10 in FIG. 5, where a first sub-block index of CB 4 is sub-block 4, and a next sub-block index (i.e., a sub-block indicator) of sub-block 4 is sub-block 10. In this example, a result of a CRC of CB 4 is incorrect, a sub-block occupancy identification of each of sub-block 4 and sub-block 10 is valid, a last sub-block identification of sub-block 4 is invalid, and a last sub-block identification of sub-block 10 is valid.

Data of CB 5 is stored in sub-block 11 and sub-block 5, that is, stored in HARQ cache block 11 and HARQ cache block 5 in FIG. 5, where a first sub-block index of CB 5 is sub-block 11, and a next sub-block index (i.e., a sub-block indicator) of sub-block 11 is sub-block 5. In this example, a result of a CRC of CB 5 is incorrect, a sub-block occupancy identification of each of sub-block 11 and sub-block 5 is valid, a last sub-block identification of sub-block 11 is invalid, and a last sub-block identification of sub-block 5 is valid.

It should be noted that, although whether a process retransmission identification of each process is valid and whether a sub-block occupancy identification and a last sub-block identification of each sub-block are valid are not illustrated in FIG. 5, those skilled in the art can set them according to needs in practice.

As an example, the process retransmission identification, the sub-block occupancy identification, and the last sub-block identification are each set to occupy 1 bit, where "0" represents invalid and "1" represents valid.

It should be understood that, the above description of data storage is exemplary and should not be construed as a limiting of the disclosure.

In some implementations, the HARQ process includes multiple CBs, and the method further includes: on condition that data carried in the HARQ process is retransmitted data, determining from the storage space a CB of the HARQ process whose CRC is incorrect, performing HARQ combination on the retransmitted data and the CB whose CRC is incorrect to obtain HARQ combined data of the CB whose CRC is incorrect, and performing FEC decoding and CRC on the HARQ combined data; on condition that the CRC of the HARQ combined data is correct, determining from the storage space a CB of the HARQ process whose CRC is correct, to obtain a complete decoding result of the HARQ process; or on condition that the CRC of the HARQ combined data is incorrect, storing the HARQ combined data to the storage space and overwriting the CB of the HARQ process whose CRC is incorrect.

HARQ combination can be implemented based on relevant technologies.

For an HARQ process, if the HARQ process includes multiple CBs, since some of the CBs subjected to decoding are checked to be correct, decoded data is stored to the storage space. Since some of the CBs subjected to decoding are checked to be incorrect, data before decoding is stored to the storage space. In implementations of the disclosure, if the data carried in the HARQ process is retransmitted data, HARQ combination, decoding, and check are performed only on data whose check is incorrect previously and the retransmitted data, while a CB whose check is correct previously will not be decoded and checked repeatedly, which can improve efficiency of the decoding and the checking. In implementations of the disclosure, if the HARQ combined data is still checked to be incorrect, the HARQ combined data of check incorrect portion is stored to a storage space of a CB whose check is incorrect previously, which can improve a storage speed. Moreover, the HARQ combined data is stored, which is beneficial to correcting a CB whose check is incorrect in the next time.

In some implementations, after obtaining the complete decoding result of the HARQ process, the method further includes: releasing the storage space of the CB of the HARQ process.

In some implementations, releasing the storage space of the CB of the HARQ process includes: setting a process retransmission identification of the HARQ process to be invalid; and setting a sub-block occupancy identification of the storage sub-block storing the CB of the HARQ process to be invalid.

According to the above method of implementations of the disclosure, after obtaining the complete decoding result of the HARQ process, the storage space of the CB is released. By setting the process retransmission identification and the sub-block occupancy identification to be invalid, the storage space can be released conveniently, and fragmentation can be reduced.

In some implementations, on condition that a CRC of each of the CBs of the HARQ process is correct, a complete decoding result is reported to an upper layer through data transfer, to perform command parsing to obtain required parameters or control information. Optionally, the data transfer may adopt a combination of chain DMA and offset parsing of header removing. Of course, the above description is exemplary, and how to transfer data and how to process the complete decoding result are not limited in the disclosure, which can be implemented by those skilled in the art by referring to relevant technologies.

The method for data storage will be exemplarily described below.

Figure 6:
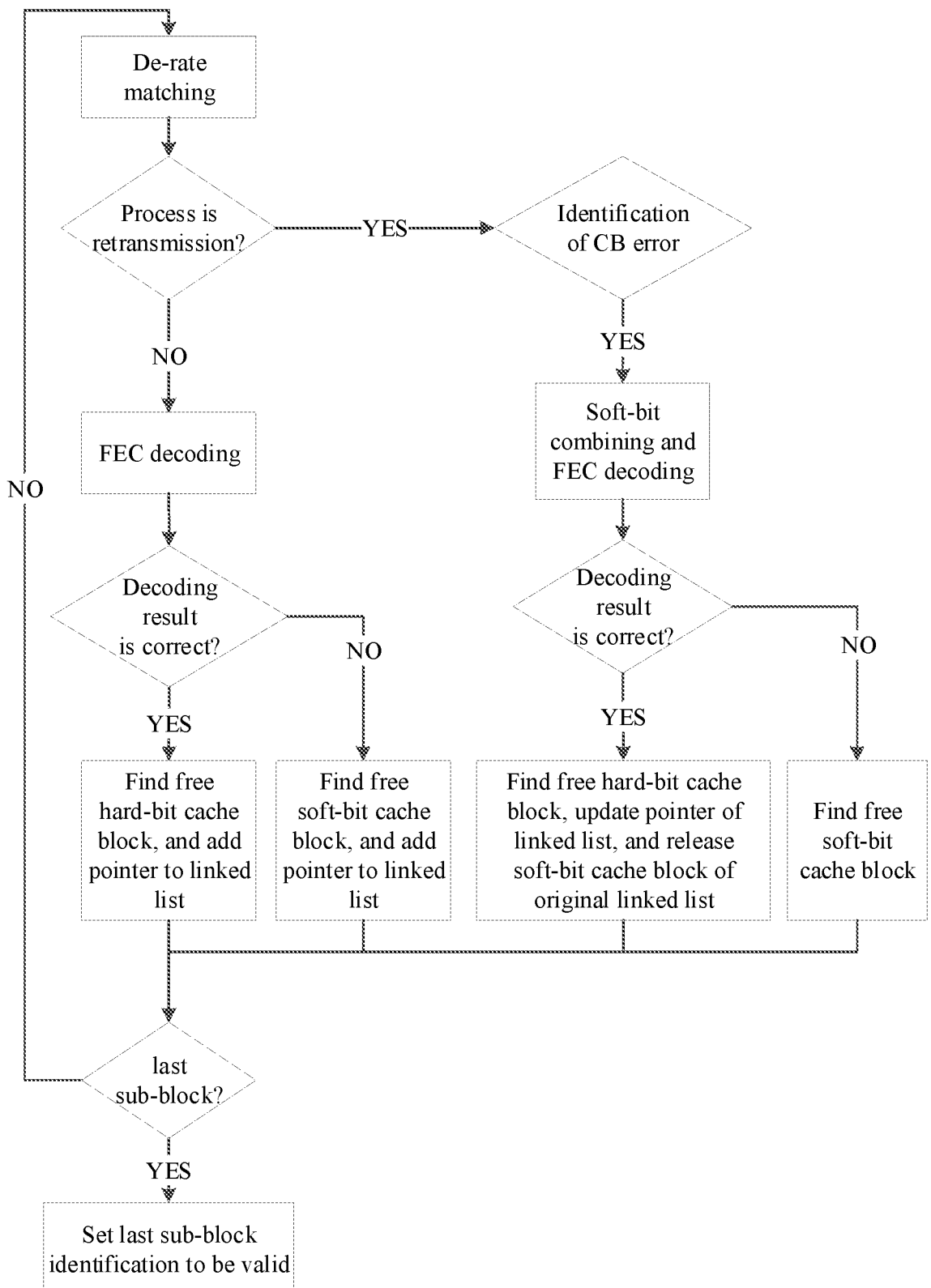
FIG. 6 is a schematic diagram illustrating a method for data storage according to implementations of the disclosure.

Referring to FIG. 6, FIG. 6 is a schematic diagram illustrating a method for data storage according to implementations of the disclosure.

As illustrated in FIG. 6, upon obtaining data transmitted by a transmitter (e.g., a network-element device), a receiver (e.g., a UE) performs de-rate matching on received data, and determines whether an HARQ process is retransmission. If the HARQ process is not retransmission (i.e., data carried in the HARQ process is new data rather than retransmitted data), the receiver performs FEC decoding and CRC on data subjected to the de-rate matching. On condition that the CRC is correct, a storage sub-block of a first type is determined in a storage space to store decoded data. On condition that the CRC is incorrect, a storage sub-block of a second type is determined in the storage space to store soft information (i.e., data before decoding). Accordingly, HARQ cache management information is set, for example, setting a sub-block indicator of the storage sub-block, a last sub-block identification of the storage sub-block, etc.

On the other hand, if the HARQ process is retransmission (i.e., data carried in the HARQ process is retransmitted data), the receiver obtains from the storage space data of a CB whose check is incorrect, and performs HARQ combination, FEC decoding, and CRC on the retransmitted data and the data of the CB whose check is incorrect. On condition that the CRC is correct, a storage sub-block of a first type is determined in the storage space to store decoded data of HARQ combined data. On condition that the CRC is incorrect, data of a CB (stored in the storage space) whose CRC is incorrect is overwritten with the HARQ combined data. Accordingly, the HARQ cache management information is set, for example, setting a sub-block indicator of the storage sub-block, a last sub-block identification of the storage sub-block, etc.

Figure 7:
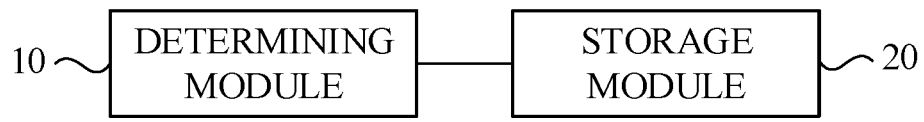
FIG. 7 is a block diagram illustrating a device for data storage according to implementations of the disclosure.

Referring to FIG. 7, FIG. 7 is a block diagram illustrating a device for data storage according to implementations of the disclosure.

As illustrated in FIG. 7, the device includes a determining module 10 and a storage module 20. The determining module 10 is configured to determine multiple storage sub-blocks in a storage space according to a size of a CB of an HARQ process, where the storage sub-block has a sub-block indicator, and the sub-block indicator indicates a next storage sub-block to which a present storage sub-block points. The storage module 20 is coupled with the determining module 10 and configured to store the CB of the HARQ process to the multiple storage sub-blocks.

According to the above device of implementation of the disclosure, the multiple storage sub-blocks in the storage space are determined according to the size of the CB of the HARQ process, and the CB of the HARQ process is stored into the multiple storage sub-blocks. In implementations of the disclosure, since each of the storage sub-blocks has a sub-block indicator which indicates the next storage sub-block to which the present storage sub-block points, chain control of the storage sub-blocks can be realized, so that management and allocation of storage resources in the storage space can be more convenient and flexible, and storage fragmentation and power consumption can be reduced effectively.

In some implementations, the storage sub-block includes a storage sub-block of a first type and the storage sub-block of the first type is used to store decoded data. The determining module configured to determine the multiple storage sub-blocks in the storage space according to the size of the CB of the HARQ process is configured to: determine the multiple storage sub-blocks in storage sub-blocks of the first type according to the size of the CB, on condition that a CRC of the CB subjected to an FEC decoding is correct. The storage module configured to store the CB of the HARQ process to the multiple storage sub-blocks is configured to: store the CB subjected to the FEC decoding to the determined multiple storage sub-blocks of the first type.

In some implementations, a size of the storage sub-block of the first type is ¼ to 1 times a size of a largest CB of the HARQ process.

In some implementations, the storage sub-block includes a storage sub-block of a second type and the storage sub-block of the second type is used to store data before decoding. The determining module configured to determine the multiple storage sub-blocks in the storage space according to the size of the CB of the HARQ process is configured to: determine the multiple storage sub-blocks in storage sub-blocks of the second type according to the size of the CB, on condition that a CRC of the CB subjected to an FEC decoding is incorrect. The storage module configured to store the CB of the HARQ process to the multiple storage sub-blocks is configured to: store the CB before decoding to the determined multiple storage sub-blocks of the second type.

In some implementations, a size of the storage sub-block of the second type is ⅛ to ½ times a size of a largest CB of the HARQ process.

In some implementations, the device is further configured to set a process retransmission identification of the HARQ process according to whether the CB of the HARQ process is stored in the storage space, where the process retransmission identification is set to be valid to indicate that the HARQ process carries retransmitted data, on condition that the CB of the HARQ process exists in the storage space; or the process retransmission identification is set to be invalid to indicate that the HARQ process carries new data, on condition that no CB of the HARQ process exists in the storage space.

In some implementations, the device is further configured to set a check-result identification of the CB according to a result of the CRC of the CB, where the check-result identification includes a correct check identification and an incorrect check identification.

In some implementations, storing the CB of the HARQ process to the multiple storage sub-blocks includes: setting an identification of a first sub-block of the CB to be a first storage sub-block for storing the CB among the multiple storage sub-blocks; setting a sub-block occupancy identification of the storage sub-block to be valid, where the sub-block occupancy identification being valid indicates that the storage sub-block is occupied; setting the sub-block indicator of the storage sub-block, where for each storage sub-block from the first storage sub-block to a penultimate storage sub-block, a sub-block indicator of the storage sub-block points to a next storage sub-block, and a sub-block indicator of a last storage sub-block is invalid; and setting a last sub-block identification of the storage sub-block, including: setting a last sub-block identification of the last storage sub-block to be valid, and setting a last sub-block identification of each of other storage sub-blocks to be invalid, where the last sub-block identification indicates that a storage sub-block corresponding thereto is the last storage sub-block for storing the CB among the multiple storage sub-blocks.

In some implementations, the HARQ process includes multiple CBs, and the device is further configured to: on condition that data carried in the HARQ process is retransmitted data, determine from the storage space a CB of the HARQ process whose CRC is incorrect, perform HARQ combination on the retransmitted data and the CB whose CRC is incorrect to obtain HARQ combined data of CRC incorrect portion, and perform FEC decoding and CRC on the HARQ combined data; on condition that the CRC of the HARQ combined data is correct, determine from the storage space a CB of the HARQ process whose CRC is correct, to obtain a complete decoding result of the HARQ process; or on condition that the CRC of the HARQ combined data is incorrect, store the HARQ combined data to the storage space and overwrite the CB of the HARQ process whose CRC is incorrect.

In some implementations, after obtaining the complete decoding result of the HARQ process, the device is further configured to release the storage space of the CB of the HARQ process.

In some implementations, releasing the storage space of the CB of the HARQ process includes: setting a process retransmission identification of the HARQ process to be invalid; and setting a sub-block occupancy identification of the storage sub-block storing the CB of the HARQ process to be invalid.

In some implementations, the storage space includes an off-chip storage space and an on-chip storage space.

It should be noted that, the above device for data storage is a device corresponding to the above method for data storage. For details, reference can be made to the above description of the method, which will not be repeated herein.

Figure 8:
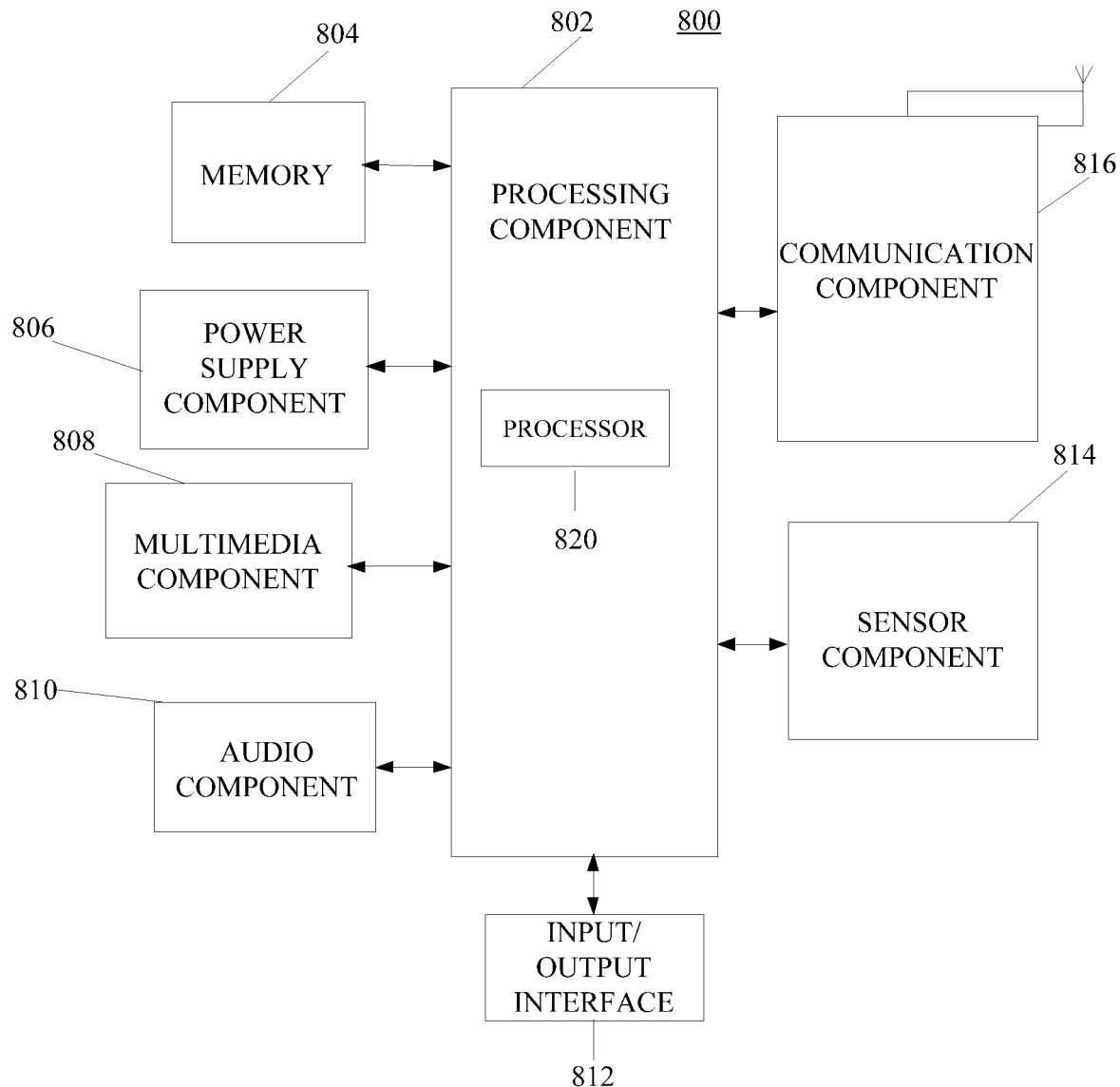
FIG. 8 is a block diagram illustrating a device for data storage according to implementations of the disclosure.

Referring to FIG. 8, FIG. 8 is a block diagram illustrating a device for data storage according to implementations of the disclosure.

As an example, a device 800 for data storage may be a mobile phone, a computer, a device for digital broadcasting data storage, a messaging device, a game console, a tablet device, a medical device, a fitness device, a personal digital assistant, and the like.

As illustrated in FIG. 8, the device 800 for data storage may include one or more of the following components: a processing component 802, a memory 804, a power supply component 806, a multimedia component 808, an audio component 810, an input/output (I/O) interface 812, a sensor component 814, and a communication component 816.

Generally, the processing component 802 is configured to control the overall operation of the device 800 for data storage, such as operations associated with display, telephone call, data communication, camera operations, and recording operations. The processing component 802 may include one or more processors 820 to execute instructions to complete all or part of the operations of the foregoing method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations in the device 800 for data storage. Examples of these data include instructions for any application or method operated on the device 800 for data storage, contact data, phonebook data, messages, pictures, videos, and the like. The memory 804 may be implemented by any type of transitory or non-transitory storage device or a combination thereof, such as a static RAM (SRAM), an electrically erasable programmable ROM (EEPROM), an erasable programmable ROM (EPROM), a programmable ROM (PROM), a ROM, a magnetic memory, a flash memory, a magnetic disk, or an optical disk.

The power supply component 806 is configured to provide power to various components of the device 800 for data storage. The power supply component 806 may include a power management system, one or more power supplies, and other components associated with generating, managing, and allocating power for the device 800 for data storage.

The multimedia component 808 may include a screen providing an output interface between the device 800 for data storage and a user. In some implementations, the screen may include a liquid crystal display (LCD) and a touch panel (TP). If the screen includes a touch panel, the screen may be implemented as a touch screen to receive an input signal from the user. The touch panel may include one or more touch sensors to sense touch, sliding, and gestures on the touch panel. The touch sensor can not only sense the boundary of a touch or slide operation, but also detect a duration and pressure related to the touch or slide operation. In some implementations, the multimedia component 808 includes a front camera and/or a rear camera. When the device 800 for data storage is in an operation mode, such as a shooting mode or a video mode, the front camera and/or the rear camera can receive external multimedia data. Each front camera and rear camera can be a fixed optical lens system or have focal length and optical zoom capability.

The audio component 810 is configured to output and/or input audio signals. For example, the audio component 810 includes a microphone (MIC) configured to receive an external audio signal when the device 800 for data storage is in an operation mode, such as a call mode, a recording mode, and a speech recognition mode. The received audio signal may be further stored in the memory 804 or transmitted via the communication component 816. In some implementations, the audio component 810 further includes a speaker configured to output an audio signal.

The I/O interface 812 is configured to provide an interface between the processing component 802 and a peripheral interface module. The peripheral interface module may be a keyboard, a click wheel, a button, or the like. The button may include, but is not limited to, a home button, a volume button, a start button, and a lock button.

The sensor component 814 may include one or more sensors for providing state evaluation on various aspects for the device 800 for data storage. As an example, the sensor component 814 detects an on/off state of the device 800 for data storage and the relative positioning of the components, for instance, the components are the display and keypad of the device 800 for data storage. The sensor component 814 can also detect position change of the device 800 for data storage or a component of the device 800 for data storage, presence or absence of user contact with the device 800 for data storage, orientation or acceleration/deceleration of the device 800 for data storage, and temperature change of the device 800 for data storage. The sensor component 814 may include a proximity sensor configured to detect existence of nearby objects without any physical contact. The sensor component 814 may further include an optical sensor, such as a complementary metal oxide semiconductor (CMOS) or charge-coupled device (CCD) image sensor, for use in imaging applications. In some implementations, the sensor component 814 may further include an acceleration sensor, a gyroscope sensor, a magnetic sensor, a pressure sensor, or a temperature sensor.

The communication component 816 is configured to facilitate wired or wireless communication between the device 800 for data storage and other devices. The device 800 for data storage can access a wireless network based on a communication standard, such as wireless fidelity (WiFi), 2G or 3G, or a combination thereof. In an exemplary implementation, the communication component 816 receives a broadcast signal or broadcast related information from an external broadcast management system via a broadcast channel. In an exemplary implementation, the communication component 816 further includes a near-field communication (NFC) module to facilitate short-range communication. For example, the NFC module can be implemented based on radio frequency identification (RFID) technology, infrared data association (IrDA) technology, ultra wideband (UWB) technology, Bluetooth (BT) technology, and other technologies.

In an exemplary implementation, the device 800 for data storage may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, to execute the foregoing method.

In an exemplary implementation, a non-transitory computer-readable storage medium is further provided, for example, the memory 804 for storing computer program instructions. The computer program instructions are operable with the processor 820 of the device 800 for data storage to execute the foregoing method.

Figure 9:
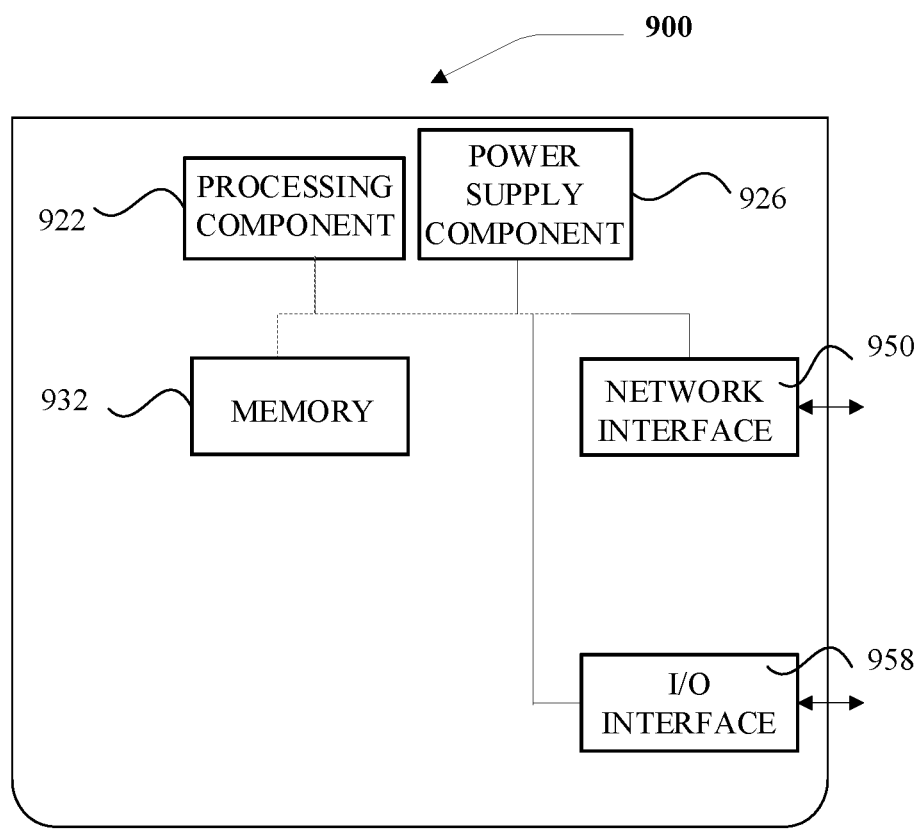
FIG. 9 is a block diagram illustrating a device for data storage according to implementations of the disclosure.

Referring to FIG. 9, FIG. 9 is a block diagram illustrating a device for data storage according to implementations of the disclosure.

As an example, a device 900 for data storage can be provided as a server. Referring to FIG. 9, the device 900 for data storage includes a processing component 922 which further includes one or more processors, and memory resources represented by a memory 932 and configured to store instructions (e.g., an application) executable with the processing component 922. The application stored in the memory 932 may include one or more modules, each corresponding to a set of instructions. In addition, the processing component 922 is configured to execute instructions to execute the foregoing method.

The device 900 for data storage may further include a power supply component 926 configured to implement power management of the device 900 for data storage, a wired or wireless network interface 950 configured to connect the device 900 for data storage to a network, and an I/O interface 958. The device 900 for data storage may operate an operating system stored in the memory 932, such as Windows Server™, Mac OS X™, Unix™, Linux™, FreeBSD™, or the like.

In an exemplary implementation, a non-transitory computer-readable storage medium is further provided, such as the memory 932 storing computer program instructions. The computer program instructions can be executed by the processing component 922 of the device 900 for data storage to execute the foregoing method.

The disclosure may provide a system, a method, and/or a computer program product. The computer program product may include a computer-readable storage medium, which carries computer-readable program instructions for causing a processor to implement various aspects of the disclosure.

The computer-readable storage medium may be a tangible device that can hold and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination of the above. More specific examples of the computer-readable storage medium include (non-exhaustive list): a portable computer disk, a hard disk, a RAM, a ROM, an EPROM or flash memory, an SRAM, a portable compact disk ROM (CD-ROM), a digital versatile disk (DVD), a memory stick, a floppy disk, a mechanical encoding device, such as a punch card or a convex structure in a groove on which instructions are stored, and any suitable combination of the above. The computer-readable storage medium herein is not interpreted as an instantaneous signal itself, such as a radio wave or other freely propagating electromagnetic wave, an electromagnetic wave propagating through a waveguide or other transmission medium (e.g., an optical pulse through an optical fiber cable), or an electrical signal transmitted through a wire.

The computer-readable program instructions herein may be downloaded from a computer-readable storage medium to various computing/processing devices, or to an external computer or external storage device through a network, such as the Internet, a local area network (LAN), a wide area network (WAN), and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions to be stored in the computer-readable storage medium in each computing/processing device.

The computer program instructions for executing the operations of the disclosure may be assembly instructions, instruction set architecture (ISA) instructions, machine instructions, machine related instructions, microcodes, firmware instructions, state setting data, or source codes or object codes written in any combination of one or more programming languages. The programming languages include object-oriented programming languages such as Smalltalk, C++, etc., and conventional procedural programming languages such as "C" language or similar programming languages. The computer-readable program instructions may be executed entirely on a user's computer, partially on the user's computer, as a separate software package, partially on the user's computer and partially on a remote computer, or entirely on the remote computer or server. In the case of a remote computer, the remote computer may be connected to the user's computer through any kind of network, including a LAN or a WAN, or may be connected to an external computer (e.g., connected through an Internet via an Internet service provider). In some implementations, an electronic circuit such as a programmable logic circuit, a field programmable gate array (FPGA), or a programmable logic array (PLA) can be individually customized by utilizing state information of the computer-readable program instructions. The electronic circuit can execute the computer-readable program instructions, to implement various aspects of the disclosure.

Various aspects of the disclosure are described herein with reference to flowcharts and/or block diagrams of the method, the device (system) and the computer program product of implementations of the disclosure. It should be understood that, each block of the flowchart and/or the block diagram and a combination of blocks in the flowchart and/or the block diagram may be implemented by the computer-readable program instructions.

These computer-readable program instructions can be provided to a processor of a general-purpose computer, a special-purpose computer, or other programmable data processing devices, to produce a machine, so that when these instructions are executed by a processor of a computer or other programmable data processing devices, a device for realizing functions/actions specified in one or more blocks in the flowchart and/or the block diagram is generated. These computer-readable program instructions may also be stored in a computer-readable storage medium, to cause a computer, a programmable data processing device, and/or other devices to operate in a specific manner, so that the computer-readable medium storing instructions includes a manufacture, which includes instructions to implement various aspects of the functions/actions specified in one or more blocks in the flowchart and/or the block diagram.

The computer-readable program instructions may also be loaded onto a computer, other programmable data processing devices, or other devices, so that a series of operation steps are performed on the computer, other programmable data processing device, or other devices to generate a computer-implemented process, so that when instructions are executed by the computer, other programmable data processing device, or other devices, the functions/actions specified in one or more blocks in the flowchart and/or the block diagram can be realized.

The flowchart and the block diagram in the accompanying drawings illustrate the architecture, functions and operations of possible implementations of the system, the method, and the computer program product of various implementations of the disclosure. In this regard, each block in the flowchart or the block diagram may represent a part of an instruction, a program segment, or a module, and the part of the instruction, the program segment, or the module contains one or more executable instructions for realizing a specified logical function. In some alternative implementations, the functions marked in the blocks may also occur in a different order than those marked in the drawings. For example, two consecutive blocks may, in fact, be executed basically in parallel, and may sometimes be executed in the opposite order, depending on the function involved. It should also be noted that, each block in the block diagram and/or the flowchart and the combination of blocks in the block diagram and/or the flowchart can be realized by a dedicated hardware-based system implementing specified functions or actions, or realized by a combination of dedicated hardware and computer instructions.

Various implementations of the disclosure have been described above, the foregoing description is exemplary rather than exhaustive, and the disclosure is not limited to the disclosed implementations. Modifications and variations will be apparent to those of ordinary skill in the art without departing from the scope and spirits of the implementations. The terminology used herein was chosen to well explain the principles of the implementations, the practical application, or improvement over the technology in the marketplace, or to enable others of ordinary skill in the art to understand the implementations disclosed herein.

What is claimed is:

1. A method for data storage, comprising:
   determining a plurality of storage sub-blocks in a storage space according to a size of a code block (CB) of a hybrid automatic repeat request (HARQ) process, the CB of the HARQ process being a largest CB of the HARQ process, each of the plurality of storage sub-blocks having a sub-block indicator, and the sub-block indicator indicating a next storage sub-block to which a present storage sub-block points; and
   storing the CB of the HARQ process to the plurality of storage sub-blocks, wherein
   the plurality of storage sub-blocks comprise a storage sub-block of a first type or a storage sub-block of a second type, a size of the storage sub-block of the first type is ¼ to 1 times the size of the largest CB of the HARQ process, and a size of the storage sub-block of the second type is ⅛ to ½ times the size of the largest CB of the HARQ process.

2. The method of claim 1, wherein the storage sub-block of the first type is used to store decoded data, wherein
   determining the plurality of storage sub-blocks in the storage space according to the size of the CB of the HARQ process comprises:
   determining the plurality of storage sub-blocks in storage sub-blocks of the first type according to the size of the CB, on condition that a cyclic redundancy check (CRC) of the CB subjected to a forward error correction (FEC) decoding is correct; and
   storing the CB of the HARQ process to the plurality of storage sub-blocks comprises:
   storing the CB subjected to the FEC decoding to the determined plurality of storage sub-blocks of the first type.

3. The method of claim 1, wherein the storage sub-block of the second type is used to store data before decoding, wherein
   determining the plurality of storage sub-blocks in the storage space according to the size of the CB of the HARQ process comprises:
   determining the plurality of storage sub-blocks in storage sub-blocks of the second type according to the size of the CB, on condition that a CRC of the CB subjected to an FEC decoding is incorrect; and
   storing the CB of the HARQ process to the plurality of storage sub-blocks comprises:
   storing the CB before decoding to the determined plurality of storage sub-blocks of the second type.

4. The method of claim 1, further comprising:
   setting a process retransmission identification of the HARQ process according to whether the CB of the HARQ process is stored in the storage space, wherein
   the process retransmission identification is set to be valid to indicate that the HARQ process carries retransmitted data, on condition that the CB of the HARQ process exists in the storage space; or
   the process retransmission identification is set to be invalid to indicate that the HARQ process carries new data, on condition that no CB of the HARQ process exists in the storage space.

5. The method of claim 1, further comprising:
   setting a check-result identification of the CB according to a result of the CRC of the CB, wherein the check-result identification comprises a correct check identification and an incorrect check identification.

6. The method of claim 1, wherein storing the CB of the HARQ process to the plurality of storage sub-blocks comprises:
   setting an identification of a first sub-block of the CB to be a first storage sub-block for storing the CB among the plurality of storage sub-blocks;
   setting a sub-block occupancy identification of the storage sub-block to be valid, wherein the sub-block occupancy identification being valid indicates that the storage sub-block is occupied;
   setting the sub-block indicator of the storage sub-block, wherein for each storage sub-block from the first storage sub-block to a penultimate storage sub-block, a sub-block indicator of the storage sub-block points to a next storage sub-block, and a sub-block indicator of a last storage sub-block is invalid; and
   setting a last sub-block identification of the storage sub-block, comprising:
   setting a last sub-block identification of the last storage sub-block to be valid, and setting a last sub-block identification of each of other storage sub-blocks to be invalid, wherein the last sub-block identification indicates that a storage sub-block corresponding thereto is the last storage sub-block for storing the CB among the plurality of storage sub-blocks.

7. The method of claim 1, wherein the HARQ process comprises a plurality of CBS, and the method further comprises:

on condition that data carried in the HARQ process is retransmitted data, determining from the storage space a CB of the HARQ process whose CRC is incorrect, performing HARQ combination on the retransmitted data and the CB whose CRC is incorrect to obtain HARQ combined data of the CB whose CRC is incorrect, and performing FEC decoding and CRC on the HARQ combined data;

on condition that the CRC of the HARQ combined data is correct, determining from the storage space a CB of the HARQ process whose CRC is correct, to obtain a complete decoding result of the HARQ process; or on condition that the CRC of the HARQ combined data is incorrect, storing the HARQ combined data to the storage space and overwriting the CB of the HARQ process whose CRC is incorrect.

8. The method of claim 7, wherein after obtaining the complete decoding result of the HARQ process, the method further comprises:

releasing the storage space of the CB of the HARQ process.

9. The method of claim 8, wherein releasing the storage space of the CB of the HARQ process comprises:

setting a process retransmission identification of the HARQ process to be invalid; and setting a sub-block occupancy identification of the storage sub-block storing the CB of the HARQ process to be invalid.

10. The method of claim 1, wherein the storage space comprises an off-chip storage space and an on-chip storage space.

11. A device for data storage, comprising:

a processor; and a memory, coupled with the processor and storing processor-executable instructions which, when executed by the processor, cause the processor to:

determine a plurality of storage sub-blocks in a storage space according to a size of a code block (CB) of a hybrid automatic repeat request (HARQ) process, the CB of the HARQ process being a largest CB of the HARQ process, each of the plurality of storage sub-blocks having a sub-block indicator, and the sub-block indicator indicating a next storage sub-block to which a present storage sub-block points; and store the CB of the HARQ process to the plurality of storage sub-blocks, wherein the plurality of storage sub-blocks comprise a storage sub-block of a first type or a storage sub-block of a second type, a size of the storage sub-block of the first type is ¼ to 1 times the size of the largest CB of the HARQ process, and a size of the storage sub-block of the second type is ⅛ to ½ times the size of the largest CB of the HARQ process.

12. The device of claim 11, wherein the storage sub-block of the first type is used to store decoded data, wherein the processor configured to determine the plurality of storage sub-blocks in the storage space according to the size of the CB of the HARQ process is configured to:

determine the plurality of storage sub-blocks in storage sub-blocks of the first type according to the size of the CB, on condition that a cyclic redundancy check (CRC) of the CB subjected to a forward error correction (FEC) decoding is correct; and the processor configured to store the CB of the HARQ process to the plurality of storage sub-blocks is configured to:

store the CB subjected to the FEC decoding to the determined plurality of storage sub-blocks of the first type.

13. The device of claim 11, wherein the storage sub-block of the second type is used to store data before decoding, wherein the processor configured to determine the plurality of storage sub-blocks in the storage space according to the size of the CB of the HARQ process is configured to:

determine the plurality of storage sub-blocks in storage sub-blocks of the second type according to the size of the CB, on condition that a CRC of the CB subjected to an FEC decoding is incorrect; and the processor configured to store the CB of the HARQ process to the plurality of storage sub-blocks is configured to:

store the CB before decoding to the determined plurality of storage sub-blocks of the second type.

14. The device of claim 11, wherein the processor is further configured to:

set a process retransmission identification of the HARQ process according to whether the CB of the HARQ process is stored in the storage space, wherein the process retransmission identification is set to be valid to indicate that the HARQ process carries retransmitted data, on condition that the CB of the HARQ process exists in the storage space; of the process retransmission identification is set to be invalid to indicate that the HARQ process carries new data, on condition that no CB of the HARQ process exists in the storage space.

15. The device of claim 11, wherein the processor is further configured to:

set a check-result identification of the CB according to a result of the CRC of the CB, wherein the check-result identification comprises a correct check identification and an incorrect check identification.

16. The device of claim 11, wherein the processor configured to store the CB of the HARQ process to the plurality of storage sub-blocks is configured to:

set an identification of a first sub-block of the CB to be a first storage sub-block for storing the CB among the plurality of storage sub-blocks;

set a sub-block occupancy identification of the storage sub-block to be valid, wherein the sub-block occupancy identification being valid indicates that the storage sub-block is occupied;

set the sub-block indicator of the storage sub-block, wherein for each storage sub-block from the first storage sub-block to a penultimate storage sub-block, a sub-block indicator of the storage sub-block points to a next storage sub-block, and a sub-block indicator of a last storage sub-block is invalid; and set a last sub-block identification of the storage sub-block, comprising:

setting a last sub-block identification of the last storage sub-block to be valid, and setting a last sub-block identification of each of other storage sub-blocks to be invalid, wherein the last sub-block identification indicates that a storage sub-block corresponding thereto is the last storage sub-block for storing the CB among the plurality of storage sub-blocks.

17. The device of claim 11, wherein the HARQ process comprises a plurality of CBs, and the processor is further configured to:

on condition that data carried in the HARQ process is retransmitted data, determine from the storage space a CB of the HARQ process whose CRC is incorrect, perform HARQ combination on the retransmitted data and the CB whose CRC is incorrect to obtain HARQ combined data of the CB whose CRC is incorrect, and perform FEC decoding and CRC on the HARQ combined data;

on condition that the CRC of the HARQ combined data is correct, determine from the storage space a CB of the HARQ process whose CRC is correct, to obtain a complete decoding result of the HARQ process; or on condition that the CRC of the HARQ combined data is incorrect, store the HARQ combined data to the storage space and overwrite the CB of the HARQ process whose CRC is incorrect.

18. The device of claim 17, wherein after obtaining the complete decoding result of the HARQ process, the processor is further configured to:

release the storage space of the CB of the HARQ process.

19. A non-transitory computer-readable storage medium, storing computer program instructions which, when executed by a computer, cause the computer to carry out actions, comprising:

determining a plurality of storage sub-blocks in a storage space according to a size of a code block (CB) of a hybrid automatic repeat request (HARQ) process, the CB of the HARQ process being a largest CB of the HARQ process, each of the plurality of storage sub-blocks having a sub-block indicator, and the sub-block indicator indicating a next storage sub-block to which a present storage sub-block points; and storing the CB of the HARQ process to the plurality of storage sub-blocks, wherein the plurality of storage sub-blocks comprise a storage sub-block of a first type or a storage sub-block of a second type, a size of the storage sub-block of the first type is $\frac{1}{4}$ to 1 times the size of the largest CB of the HARQ process, and a size of the storage sub-block of the second type is $\frac{1}{8}$ to $\frac{1}{2}$ times the size of the largest CB of the HARQ process.

20. The device of claim 18, wherein the processor configured to release the storage space of the CB of the HARQ process is configured to:

set a process retransmission identification of the HARQ process to be invalid; and set a sub-block occupancy identification of the storage sub-block storing the CB of the HARQ process to be invalid.

* * * * *